(12) United States Patent
Maunz et al.

(10) Patent No.: US 11,488,268 B2
(45) Date of Patent: Nov. 1, 2022

(54) AUTHENTICITY VERIFICATION OF A DIGITAL MODEL

(71) Applicant: HEXAGON TECHNOLOGY CENTER GMBH, Heerbrugg (CH)

(72) Inventors: Johannes Maunz, Rebstein (CH); Bernd Reimann, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 137 days.

(21) Appl. No.: 16/666,181

(22) Filed: Oct. 28, 2019

(65) Prior Publication Data

US 2020/0134755 A1 Apr. 30, 2020

(30) Foreign Application Priority Data

Oct. 29, 2018 (EP) .................................... 18203216

(51) Int. Cl.
*G06Q 10/06* (2012.01)
*G06Q 50/16* (2012.01)
(Continued)

(52) U.S. Cl.
CPC ........... *G06Q 50/165* (2013.01); *G06F 16/27* (2019.01); *G06Q 10/063114* (2013.01); *G06Q 50/08* (2013.01)

(58) Field of Classification Search
None
See application file for complete search history.

(56) References Cited

U.S. PATENT DOCUMENTS

| 7,735,060 | B2 | 6/2010 | Harvey et al. |
| 2008/0005287 | A1 | 1/2008 | Harvey et al. |

(Continued)

FOREIGN PATENT DOCUMENTS

| CN | 103886139 A | 6/2014 |
| EP | 2 629 210 A1 | 8/2013 |

(Continued)

OTHER PUBLICATIONS

Woo et al. (Junghoon Woo, Ridah Fatima, Charles J. Kibert, Richard E. Newman, Yifeng Tian, Ravi S. Srinivasan; Applying blockchain technology for building energy performance measurement, reporting, and verification (MRV) and the carbon credit market: A review of the literature, Building and Environment; vol. 205.*
Anonymous: Blockchain—Wikipedia, accessed on Oct. 21, 2018, pp. 1-15, XP055556958, retrieved on Sep. 11, 2019.

(Continued)

*Primary Examiner* — Matthew D Henry
(74) *Attorney, Agent, or Firm* — Maschoff Brennan

(57) ABSTRACT

A system for documenting a state of a building, comprising a first measuring system to determine actual data of the building, and at least one server having a memory for storing a digital model of the building, the server providing the digital model to the first measuring system and providing a blockchain of blocks, each block comprising a timestamp, hash data of a previous block and change data related to changes of the model, wherein a current block comprises current change data related to a latest change and task data related to tasks to be performed at the building hat have to be met. The first measuring system is adapted to interpret the task data, perform a measuring task, generate measurement data obtained by performing the measuring task, and to generate a new block of the blockchain, wherein the server is adapted to verify an admissibility of the new block.

9 Claims, 7 Drawing Sheets

(51) Int. Cl.
G06F 16/27 (2019.01)
G06Q 50/08 (2012.01)

(56) References Cited

U.S. PATENT DOCUMENTS

| | | |
|---|---|---|
| 2008/0010631 A1 | 1/2008 | Harvey et al. |
| 2013/0329018 A1* | 12/2013 | Gordon ................ G01C 11/025 348/48 |
| 2014/0192159 A1 | 7/2014 | Chen et al. |
| 2014/0268064 A1 | 9/2014 | Kahle et al. |
| 2016/0321654 A1* | 11/2016 | Lesavich ............... H04L 67/104 |
| 2019/0258971 A1* | 8/2019 | Winarski ....... G06Q 10/063114 |
| 2021/0055718 A1* | 2/2021 | Rathgeb ................ H04L 9/3239 |

FOREIGN PATENT DOCUMENTS

| | | |
|---|---|---|
| EP | 3 156 898 A1 | 4/2017 |
| EP | 3 522 003 A1 | 8/2019 |
| EP | 3579161 A1 | 12/2019 |
| JP | 5489310 B1 | 5/2014 |

OTHER PUBLICATIONS

Percio, S.D., "5 Ways That Blockchain and Cryptocurrency Technology Could Change the Construction Industry Forever", accessed on Jan. 17, 2018, pp. 1-17, XP055557034, retrieved on Sep. 11, 2019.
"Automated Total Stations—AMTS", Geo Instruments, accessed on Mar. 14, 2017, pp. 1-6, XP055531179, retrieved on Sep. 11, 2019.
Extended European Search Report dated Feb. 22, 2019 as received in Application No. 18203216.9.

\* cited by examiner

AUTHENTICITY VERIFICATION OF A DIGITAL MODEL

CROSS-REFERENCE TO RELATED APPLICATIONS

This application claims priority to European Patent Application No. 18203216.9, filed on Oct. 29, 2018. The foregoing patent application is herein incorporated by reference.

FIELD OF INVENTION

The present invention pertains to a method and a system for documenting a continuously changing state of a building or similar structure, for instance including a progress of a construction of the building. Specifically, the method and system comprise determining, supervising and documenting a progress of changes occurring throughout the lifecycle of the building using a digital model. Blockchain technology is used to ensure the authenticity of the digital model and the documented changes.

BACKGROUND

In the art of general construction work such as building construction and civil engineering, important key factors are planning, progress observation, documentation and appropriate accounting. In many instances, those aspects are getting more and more complex and dynamic, in particular due to the many parties involved, fluctuating human and/or objective resources, increased complexity of tasks and the end results, tighter schedules, increased costs of human resources, etc. Work that was formerly planned and overseen by a single manager is nowadays too complex for a single person and a splitting between multiple people often miscarries at the thereby uprising interfaces.

Therefore, it has been tried to expand automation and computerization in this technical field by using building information models (BIM). In the art of building construction, the documents EP 2 629 210, JP 5489310, CN 103886139, US 2014/268064 or US 2014/192159 provide examples of so-called BIM-System approaches.

In the patent application EP18155182.1, a system referred to as "Edge Client" (EC) is described that provides extensible IoT edge solution, process automation, secure edge connectivity and dynamically changeable workflows. It can be used together with a system and data integration software such as "EdgeFrontier" (EF) of Intergraph. Some integration tools that can be used with EC are disclosed in documents EP 3 156 898 A1, US 2008/0005287 A1, US 2008/0010631 A1 or U.S. Pat. No. 7,735,060 B2.

Blockchain technology originally has been developed as a way to provide a publicly transparent and decentralized record to track and store digital currency transactions in a publicly verifiable secure manner to prevent tampering or revision of the record. Blockchain technology has since been expanded to provide decentralized public ledgers also in other areas. Known BIM management systems and data model management systems with distributed contributors working on a central and shared model lack the immutability of blockchain data.

BRIEF DESCRIPTION OF THE INVENTION

It is therefore an object of some embodiments the present invention to provide an improved method and system for construction progress documentation.

It is another object to provide a method that allows reliably documenting a state of a building and a progress of a construction of a building.

Particularly, it is an object to provide such a method and system allowing authenticity verification of a digital construction model.

It is another object to provide such a method and system that can be used with existing devices, legacy systems, and untrained users.

At least one of these objects is achieved by the system according to claim 1, the method according to claim 9 and/or the dependent claims of the present invention.

A first aspect of some aspects the present invention pertains to a system for documenting a state of a building, such as a progress of a construction of the building. The system comprises:

- at least a first measuring system with at least one measuring device that is configured to determine actual data of the building, and
- at least one server having a memory unit for storing a digital model comprising nominal data related to a nominal condition of the building, the server being adapted to provide the digital model to the first measuring system.

The at least one server is adapted to provide a blockchain with a plurality of blocks, each block comprising a timestamp, hash data of a previous block, and change data related to changes of the model, so that each block represents one entry in a list of previous changes to the model, wherein a current block comprises current change data related to a latest change. According to this aspect of the invention, the current block comprises task data related to one or more measuring tasks to be performed in or at the building, and the task data comprises predetermined conditions that have to be met when performing one of the measuring tasks. The first measuring system is adapted to:

- interpret the task data and perform at least one of the measuring tasks based on the task data,
- generate measurement data obtained by performing the measuring task, the measurement data comprising three-dimensional coordinates of the building,
- generate procedure data comprising information related to circumstances related to performing the measuring task, and
- generate a new block of the blockchain comprising hash data from the current block, a timestamp, the measurement data and the procedure data.

The at least one server is adapted to verify an admissibility of the new block, wherein the verification comprises determining, based on the procedure data, whether the measuring task has been performed according to the predetermined conditions.

The digital model optionally can be a digital twin of the building.

According to one embodiment of the system, the predetermined conditions comprise set device specifications comprising conditions that the at least one measuring device must fulfil when performing the measuring task, the procedure data comprises specification data related to actual device specifications of the at least one measuring device while performing the measuring task, and verifying the admissibility of the new block comprises determining whether the actual device specifications meet the conditions of the set device specifications.

The conditions may be minimum conditions and/or may be related to at least one of a date of a latest calibration or inspection of the at least one measuring device, and a measuring precision of the at least one measuring device.

The conditions can also refer to the operator of the measurement device, e.g. to a minimum qualification level, requiring a certificate to carry out the task, or only allowing specific people from a predefined list to do the job.

According to another embodiment of the system, the predetermined conditions comprise setup specifications comprising conditions that a setup of the at least one measuring device must fulfil when performing the measuring task, the procedure data comprises setup data related to the setup of the at least one measuring device while performing the measuring task, and verifying the admissibility of the new block comprises determining whether the setup meets the conditions of the setup specifications.

For instance, the at least one measuring device may be adapted to determine its position while performing the measuring task, and the setup data comprises position data related to the position of the at least one measuring device while performing the measuring task. Especially if the measurements are carried out by a drone or robot that moves along a trajectory during the measurements, also a position before and/or after performing the measurement might be part of the position data.

According to another embodiment of the system, after a setup of the at least one measuring device for a first measuring task of the measuring tasks, the first measuring system is adapted to perform the first measuring task autonomously. For instance, the setup can be performed by a user of the first measuring system. The predetermined conditions may comprise setup specifications comprising conditions that the setup must fulfil when performing the first measuring task.

According to another embodiment of the system, the blockchain is stored distributed across a plurality of interconnected computing devices, particularly wherein the at least one server is part of a cloud of interconnected remote computing devices, and the blockchain is stored in the cloud.

According to another embodiment of the system, the first measuring system is adapted to use the digital model and the current block to determine deviations of the actual data from the nominal data, to generate new change data comprising information about the deviations, and to generate the new block of the blockchain comprising the new change data.

According to another embodiment of the system, the actual data comprise three-dimensional coordinates of the building, wherein the at least one measuring device is configured to determine the three-dimensional coordinates, and the first measuring system is adapted to use the three-dimensional coordinates to determine deviations of the actual data from the nominal data. For instance, the at least one measuring device can be adapted as or comprise a laser scanner, a laser tracker or a geodetic apparatus.

According to yet another embodiment of the system, the first measuring system comprises at least one software agent that is adapted to be used with the at least one measuring device, wherein each software agent is either installable on one of the measuring devices or installed on a communication module that is adapted to be connected to a measuring device and to exchange data with the measuring device connected to. Each software agent is adapted to exchange data with the measuring device it is installed on or connected to. In particular, at least one of the software agents may be adapted to determine the deviations of the actual data from the nominal data, generate the new change data, and/or generate the new block of the blockchain.

A second aspect of the present invention pertains to a method for documenting a state of a building, or a progress of a construction of the building. Said method comprises providing:
a digital model comprising nominal data related to a nominal condition of the building, particularly wherein the digital model is a digital twin of the building, a building information model or part of a building information model, and
a blockchain with a plurality of blocks, each block comprising a timestamp, hash data of a previous block, and change data related to changes of the model, so that each block represents one entry in a list of previous changes to the model, wherein a current block comprises current change data related to a latest change.

According to this aspect of the invention, the current block comprises task data related to one or more measuring tasks to be performed in or at the building, wherein the task data comprises predetermined conditions that have to be met when performing one of the measuring tasks, and wherein the method comprises:
using at least one measuring device for performing at least one of the measuring tasks based on the task data,
generating measurement data obtained by performing the measuring task, the measurement data comprising three-dimensional coordinates of the building,
generating procedure data comprising information related to circumstances related to performing the measuring task,
generating a new block of the blockchain comprising hash data from the current block, a timestamp, the measurement data and the procedure data, and
verifying an admissibility of the new block, wherein the verification comprises determining, based on the procedure data, whether the measuring task has been performed according to the predetermined conditions.

According to one embodiment of the method,
the predetermined conditions comprise set device specifications comprising conditions that the at least one measuring device must fulfil when performing the measuring task,
the procedure data comprises specification data related to actual device specifications of the at least one measuring device while performing the measuring task, and
verifying the admissibility of the new block comprises determining whether the actual device specifications meet the conditions of the set device specifications.

The conditions may be minimum conditions and/or may be related to at least one of a date of a latest calibration or inspection of the at least one measuring device, a measuring precision of the at least one measuring device, and a qualification and/or authorization of an operator of the at least one measuring device.

According to another embodiment of the method,
the predetermined conditions comprise setup specifications comprising conditions that a setup of the at least one measuring device must fulfil when performing the measuring task,
the procedure data comprises setup data related to the setup of the at least one measuring device while performing the measuring task, and
verifying the admissibility of the new block comprises determining whether the setup meets the conditions of the setup specifications.

For instance, the at least one measuring device may be adapted to determine its position while performing the measuring task, and the setup data comprises position data related to the position of the at least one measuring device while performing the measuring task.

According to another embodiment of the method, performing a measuring task comprises determining actual data of the building, wherein the method comprises using the digital model and the current block to determine deviations of the actual data from the nominal data, and generating new change data comprising information about the deviations. The new block is then generated comprising the new change data.

According to another embodiment of the method, the actual data comprise three-dimensional coordinates of the building, wherein the at least one measuring device is used to determine the three-dimensional coordinates, and the three-dimensional coordinates are used to determine deviations of the actual data from the nominal data. For instance, the at least one measuring device can be adapted as or comprise a laser scanner, a laser tracker or a geodetic apparatus.

According to yet another embodiment of the method, the at least one measuring device is part of a measuring system comprising a plurality of devices, the method comprising providing a software agent to each one of the devices wherein each software agent is adapted to exchange data with the device and wherein providing the software agent comprises installing a software agent on the device or connecting a communication module to the apparatus, wherein a software agent is installed on the communication module.

In one embodiment, at least one of the steps determining the deviations of the actual data from the nominal data, generating the new change data, and generating the new block of the blockchain is performed by at least one of the software agents. In particular, each of the steps may be performed by at least one software agent.

Another aspect of some aspects of the invention relates to a computer programme product comprising programme code which is stored on a machine-readable medium, or being embodied by an electromagnetic wave comprising a programme code segment, and having computer-executable instructions for performing, in particular when run in a system according to the first aspect, at least the following steps of the method according to the second aspect:
- controlling the at least one measuring device for performing at least one of the measuring tasks based on the task data,
- generating the measurement data obtained by performing the measuring task,
- generating the procedure data,
- generating the new block of the blockchain, and
- verifying the admissibility of the new block, wherein the verification comprises determining, based on the procedure data, whether the measuring task has been performed according to the predetermined conditions.

BRIEF DESCRIPTION OF THE DRAWINGS

The invention in the following will be described in detail by referring to exemplary embodiments that are accompanied by figures, in which.

DETAILED DESCRIPTION

Figure 1:
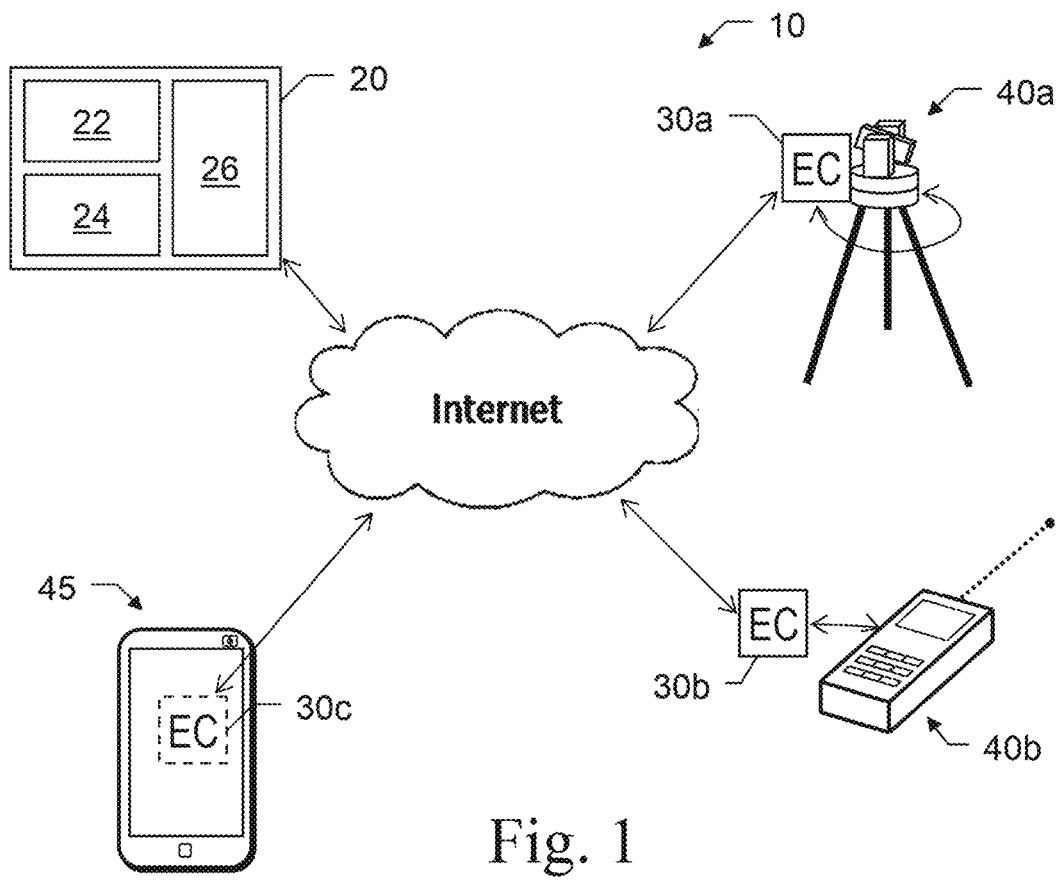
FIG. 1 shows an exemplary embodiment of a system according to the invention.

FIG. 1 shows the components of an exemplary embodiment of a system 10 for authenticity verification according to the invention. The shown system 10 comprises a server 20 and a measuring system comprising two measuring devices 40a-b and a user device 45. The server and the measuring system are connected via the Internet.

In the shown example, the devices comprise a laser scanning device 40a, a hand-held laser distance meter 40b, and a portable electronic user device 45. For instance, the user device 45 can be a smartphone or tablet PC or a wearable such as a smart watch. The measuring devices e. g. can be adapted as surveying devices, reality capture devices, laser scanners or laser trackers. Moreover, the measuring devices can comprise unmanned aerial vehicles to capture data or moving ground vehicles for reality capture and underground detection systems.

In the shown embodiment, the measuring system comprises three software agents 30a-c (EC), wherein two agents are provided in agent modules 30a-b, each of which being connected to one of the measuring devices 40a-b, and one software agent 30c is installed directly on the user device 45, e. g. as a mobile device application ("app"). The modules 30a-b with the agents installed thereon are connected to the devices 40a-b and adapted to exchange data with the respective connected device. For instance, such a connection might include using a universal serial bus (USB) or other hardware interface or a wireless data connection such as Bluetooth. A device need not be connected all the time. It is also possible for a device to receive the latest changes, then to work "offline" and perform changes, and once online again, to publish the changes on the blockchain.

As device 45 is adapted to allow installing external software or deploying a set of microservices, the respective agent 30c can be provided as a software application directly in the external device 45 instead of being provided in a module that is connectable to the device 45. It is also possible to provide the software by app delivery, e. g. by means of a mobile app that can be used for a certain workflow only or for a multitude of different workflows.

The server 20 comprises a computing unit 22 having a processor, a memory unit 24 adapted for storing data, and a communication unit 26 (e. g. comprising a modem) allowing data interchange with the agents 30a-c. The server 20 may optionally also be embodied by a cloud or a plurality of devices.

As shown, the server 20 can be connected via the Internet with the remote agent modules 30a-b and the portable device 45 comprising the third agent 30c. This is especially useful, if a direct data transfer is not possible because the devices are positioned at a larger distance from each other, e. g. more than a hundred meters away, or if, for instance, a workflow comprises capturing data of a skyscraper with multiple measuring devices positioned in several stories of the building.

Alternatively, the server 20 and the agents 30a-c can be grouped locally together and connected with each other, for instance wirelessly, e. g. by means of a wireless local area network (WLAN) or by means of mesh networks such as LoRa or ZigBee or Bluetooth. Also, some devices or modules may be connected via Internet and others connected locally to the server 20. Also, devices or modules can have both local and cloud connections.

The server 20 can comprise a user device such as a personal computer that is operated by a user and comprises input means such as keyboard and mouse for entering or selecting a task to be performed by the measuring system.

Figure 2:
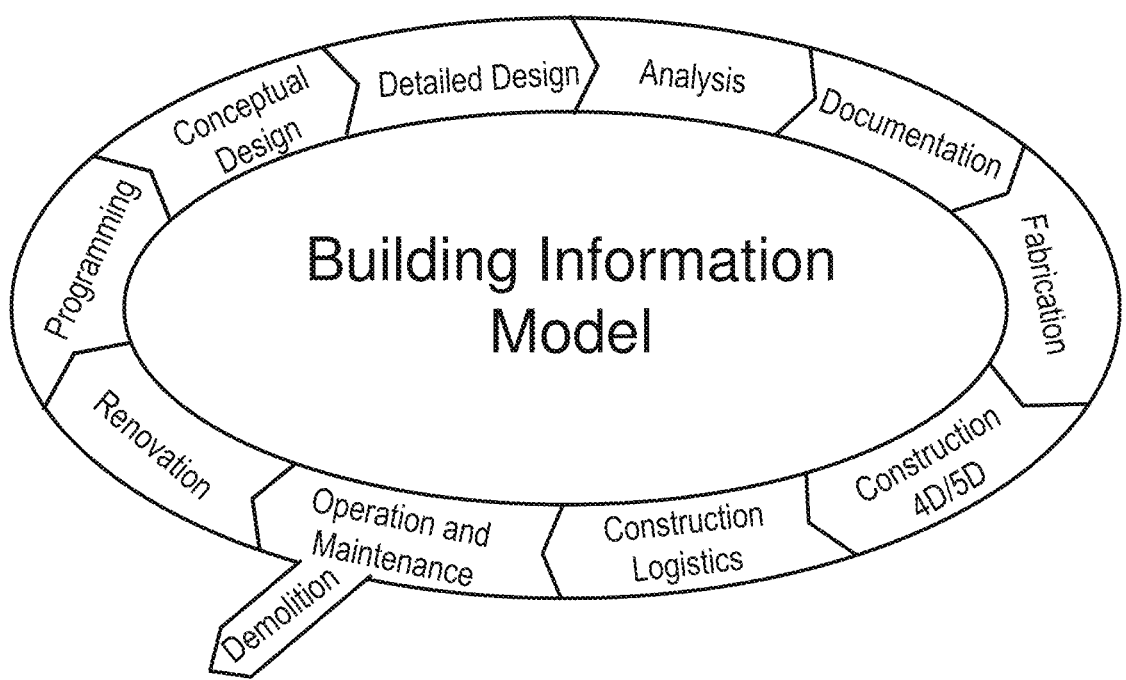
FIG. 2 illustrates an exemplary lifecycle of a building as an example of a construction.

FIG. 2 illustrates a lifecycle of a building comprising many steps from design to demolition or renovation. The building serves as an example for a structure, the lifecycle of which can be monitored using a digital model. The depicted exemplary cycle begins with programming the building's design and continues with its construction. Another important part is operation and maintenance of the building. If the building is to be renovated, the cycle starts from the beginning, if it is demolished, the cycle ends. A building information model (BIM) can be used for documenting actual and desired condition of the building during every step. Also, a digital model can be maintained in the concept of a "digital twin", the digital model not only comprising information about its current status but about its entire history.

For a project it is crucial to track changes, i.e. anything that deviates from design until the building is finished and goes into operation and maintenance. The changes comprise those that are naturally occurring and those that are made by all kinds of contractors. The changes for instance can relate to dimensional changes, changes in materials or shapes, or to design changes during the construction progress.

For safety and liability reasons, it would be advantageous to have all changes tracked, wherein a list of changes is protected from manipulation. Conflicts exists e. g. between the "as designed", the "as constructed" and the "as built" (i.e. commissioning and handover) status.

According to the present invention, this is achieved using Blockchain technology.

Figure 3:
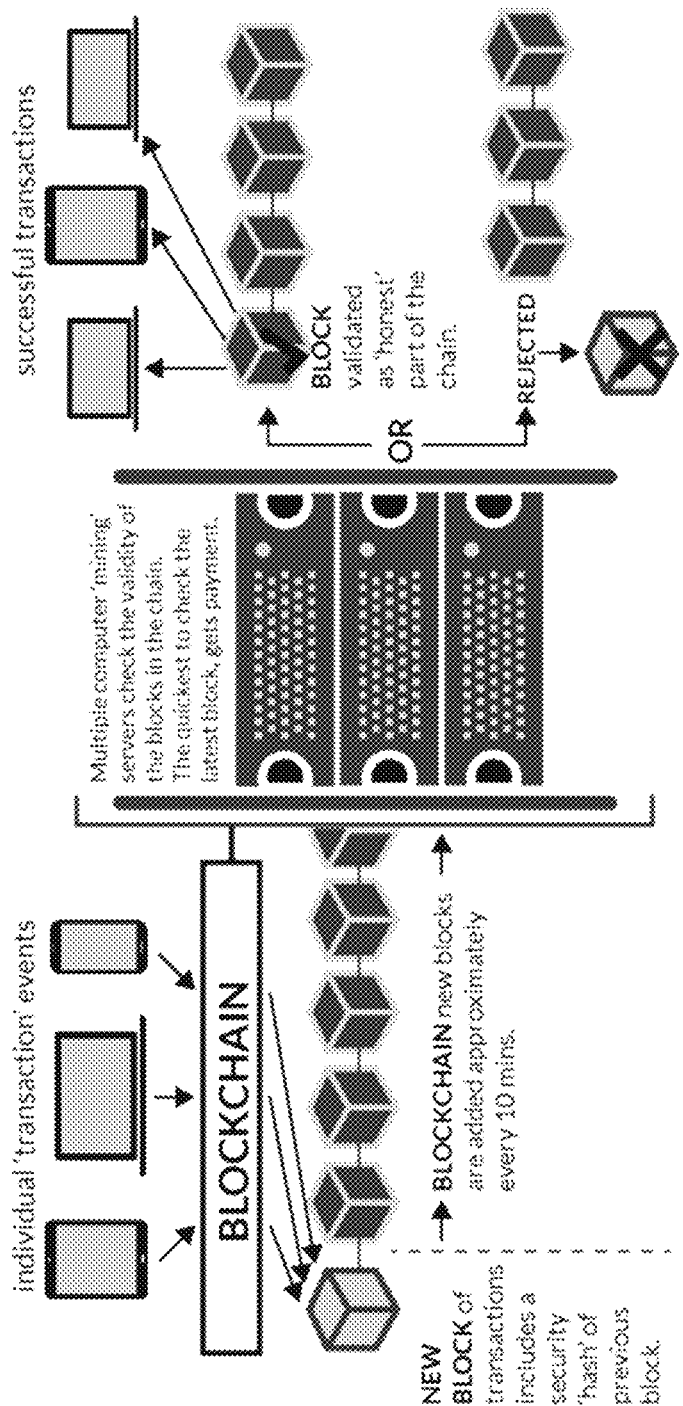
FIG. 3 shows an example for prior art use of a blockchain.

FIG. 3 shows an example for conventional use of Blockchain technology for storing changes. The blockchain comprises a continuously growing list of records, called blocks, which are linked and secured using cryptography. Typically, each block comprises a cryptographic hash of the previous block, a timestamp and transaction data of one or more individual transaction events. New blocks, including a hash of previous blocks, can be added e. g. approximately every ten minutes—this depends on the blockchain and its transaction bandwidth. For use as a distributed ledger, blockchains can be managed by peer-to-peer networks collectively adhering to a protocol for validating new blocks. Once recorded, the data in any given block cannot be altered retroactively without the alteration of all subsequent blocks, which would require collusion of the network majority.

In the given example, multiple computer servers ("mining servers") check the validity of the blocks in the chain. The quickest to check the latest block typically gets paid for the service. If the block is validated as an honest part of the chain, the transaction is successful. Otherwise it is rejected.

Figure 4:
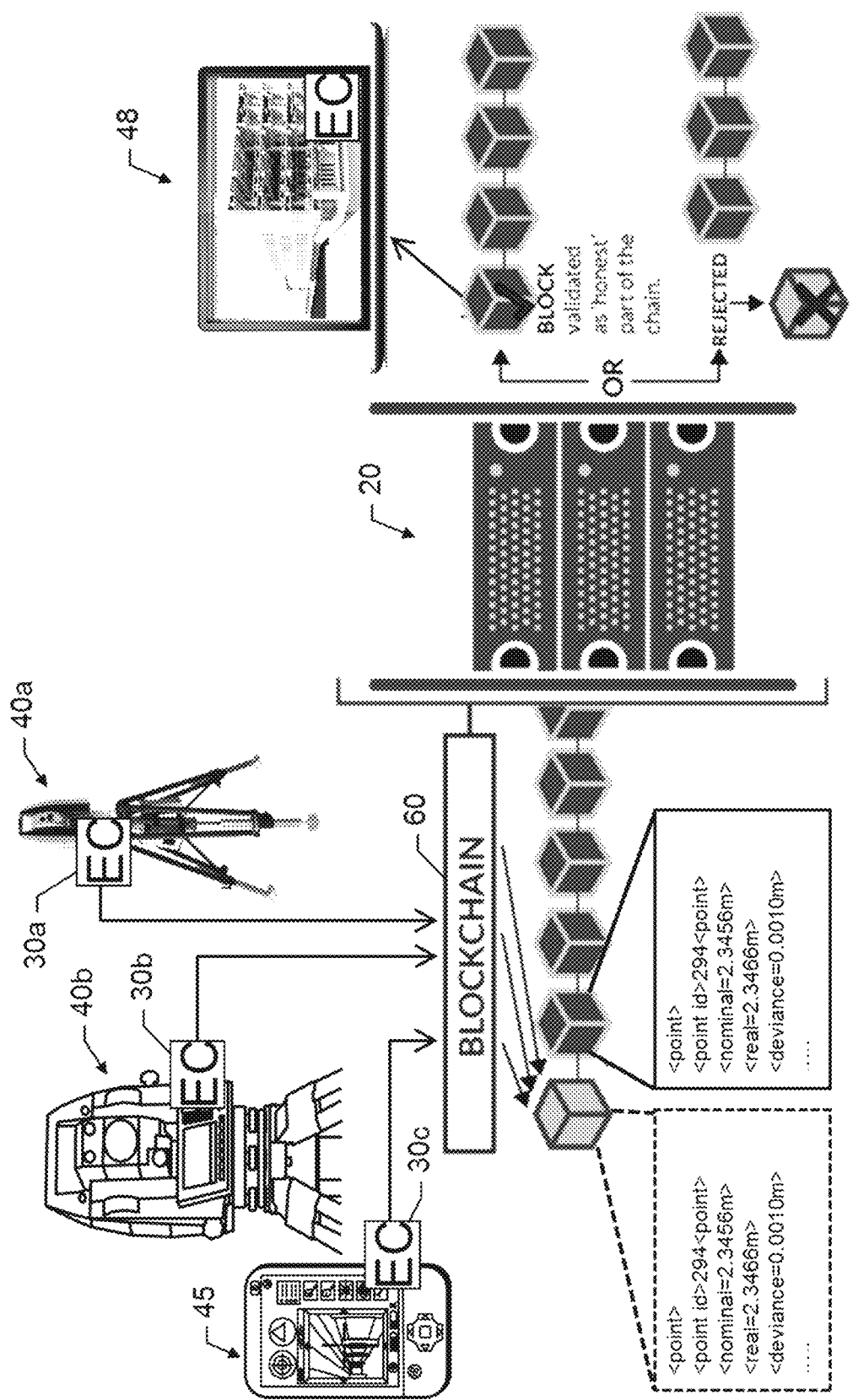
FIG. 4 shows an exemplary embodiment of a system of the invention using blockchain technology.

In FIG. 4, an exemplary embodiment of a system according to the invention is illustrated, making use of the blockchain technology shown in FIG. 3. Instead of transaction data, the blocks comprise data related to changes of a digital model, i.e. a digital construction model that can be a BIM or part of a BIM.

A measuring system is shown for measuring a building or similar structure, e. g. while the structure is under construction. The measuring system in this example comprises two measuring devices 40a,b and a mobile user device 45. Software agents 30a-c (EC) are provided at the devices 40a,b, 45 of the measuring system. Providing the software agents 30a-c to the devices can be accomplished either by installing them directly on the device, or by connecting a module to the device, on which module the software agent is installed. The software agents 30a-c is in operable communication with a server and adapted to enable data exchange between the server and the device it is installed on or connected to.

As described in the European patent application 18176798.9, also an instruction set can be deployed by the cloud.

Nominal data of the building is provided by the server as a block of the blockchain 60. The nominal data is stored on the server as a part of BIM. The measuring devices 40a,b measure dimensions of the constructions and feed the data back to the model, thus creating updated model data. The software agents 30a-c compare the nominal values and the measured values. The updated model or data comprising changes for updating the model is then saved in a new block together with a cryptographic hash of the previous block and a timestamp.

The end user can view the model updates during the building's lifetime on device 48. If the model is modified in office, i.e. not based on the data provided by the measuring system, the measuring system needs to be provided with the latest block to work with. The same applies if more than one measuring systems provide model updates at the same time and independently from each other. If a block is generated with data that is not based on the latest model, this will be detected due to the blockchain technology and the block will be rejected.

In both embodiments, changes are treated as "transactions" of the blockchain 60. They are thus tracked and traceable. A list of all changes is stored in the blockchain 60. For instance, the list of changes can be used to feed measured deviations from the nominal data back into a central 3D model.

The list of changes cannot be modified without causing the respective block to be rejected. It is however possible to modify the changes e. g. in a measurement process, but this modification will be stored as a change in the change list.

The measurement system advantageously is enabled to verify the validity of blocks provided by the server. This ensures that the model of the latest block is updated, i.e. the latest version and not an already outdated model version.

Also a query for the latest data and an instruction set as workflow (as described in the European patent application 18176798.9) can be deployed including the latest information.

A software agent 30a-c of the measuring system can be adapted to do the encryption written to the blockchain 60.

A block of the blockchain 60 e. g. can contain information about a certain object. For instance, this can be a wall, its thickness and material. If the material is changed (e. g. form oak to beech) the change will be made visible as well. These changes can be input by a user on the mobile user device 45.

Figure 5A:
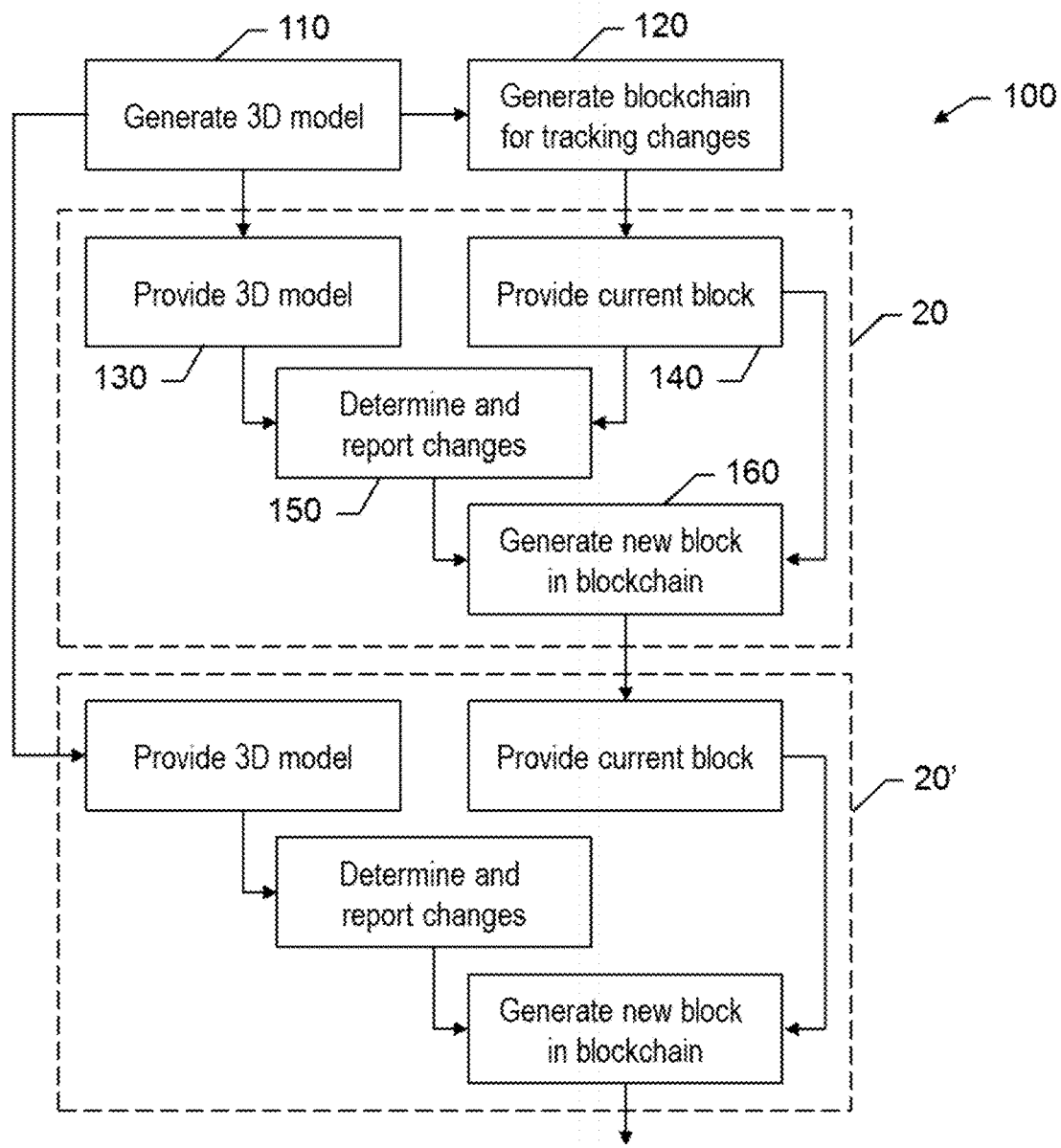
FIGS. 5a-b illustrate an exemplary embodiment of a method according to the invention.

FIG. 5a shows a flowchart illustrating a first exemplary embodiment of a method 100 according to the invention. The method begins with the generation 110 of a 3D model of a construction. A blockchain is generated 120 for tracking all changes to the 3D model, e. g. with the original model being stored in a genesis block of the blockchain.

Then, in a modification process 20, a contractor makes modifications that need to be documented. The 3D model is provided 130 to the contractor. Likewise, the current block of the blockchain is provided 140. The contractor changes the actual state of the building, determines and reports these changes 150. Determining the changes can comprise measuring coordinates of the structure after the changes have been made, e. g. using a laser scanner. Based on the changes and the current block, a new block of the blockchain is generated 160.

When the next contractor starts another modification process 20', he is provided with the 3D model and the newly created block as the current block. These modification processes can be continued throughout the lifecycle of the construction, to reliably document all changes.

Figure 5B:
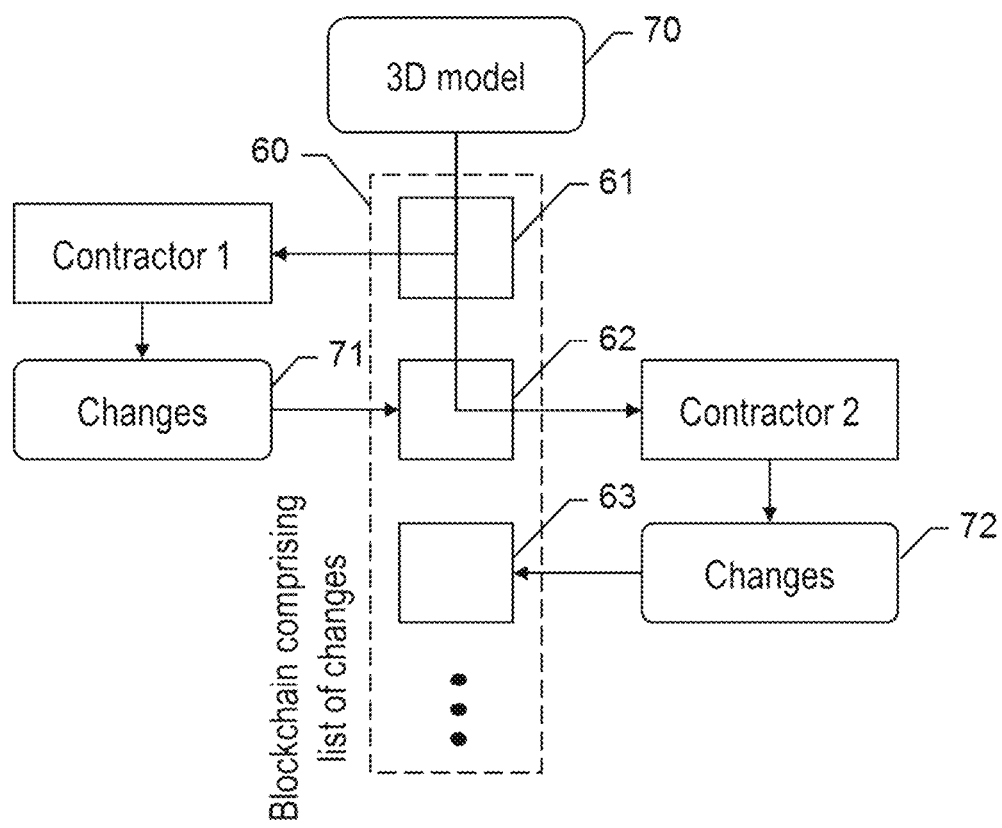

FIG. 5*b* illustrates another exemplary embodiment of a method according to the invention. A central digital 3D model 70 is provided which describes a building. A main user, i.e. the "owner" of the model, and several other users work with the model. These other users may comprise contractors, architects, designers, construction companies and public authorities. All of them have access to the base information from the model 70. Once a constructor has conducted his work, he feedbacks into the model what has happened in reality (changes 71, 72 from as-designed to as-built).

This feedback is important to the owner of the building. Particularly, it is the central point for liability issues.

For instance, in the case of new water pipes to be installed in a construction, the responsible Contractor 1 downloads the 3D model 70 of the construction from a server or cloud. He receives the data together with the latest block 61 of a blockchain 60 in which previous changes to the model are stored, verifying that the received data comprises all prior changes.

Afterwards, Contractor 1 sets up a measuring system for stake out and performs his work. It often happens that the routes of some pipes deviate from design. These changes 71 need to be documented. After the contractor is finished, he uses a laser scanner to verify the changes 71 that result from his work in order to allow updating the 3D model 70 correspondingly. He uploads the data, wherein his changes 71 are treated as a transaction of a blockchain and stored as a new block 62 in the change list hosted on the blockchain 60.

A second contractor that is responsible for building drywall to cover up the newly installed pipes now has to use the model 70 in which the first contractor's changes 71 are registered. He downloads the model 70, receiving the block 62 created after the changes 71 of Contractor 1. He then performs his work, covering up the pipes with drywall, and uses a measuring system comprising a laser scanner to verify the changes 72 that result from his work in order to allow updating the 3D model 70 correspondingly. He uploads the data, wherein his changes 72 are treated as a transaction of a blockchain and stored as a new block 63 in the change list hosted on the blockchain 60. This procedure continues for all further changes occurring in the building.

If, e. g. after two years, a water leakage is determined and a wall needs to be removed and repaired, the question of liability may arise, i.e. who must pay for the repairs.

Since, according to the invention, all changes 71, 72 to the 3D model 70 are managed via a ledger in the blockchain 60, every contractor is forced to use the latest status before re-submitting his changes 71, 72. Advantageously, the blockchain 60 is stored in a decentralized manner. In this case not even the "owner" can modify the history of changes 71, 72, as they are within a blockchain and a consensual decision would be required to allow new changes into it.

Also, a 3D model 70 can be maintained in the concept of a "digital twin" representing a digital twin of a physical asset, i.e. the 3D model not only comprises information about the current status but about the entire history comprising all changes 71, 72.

Figure 6:
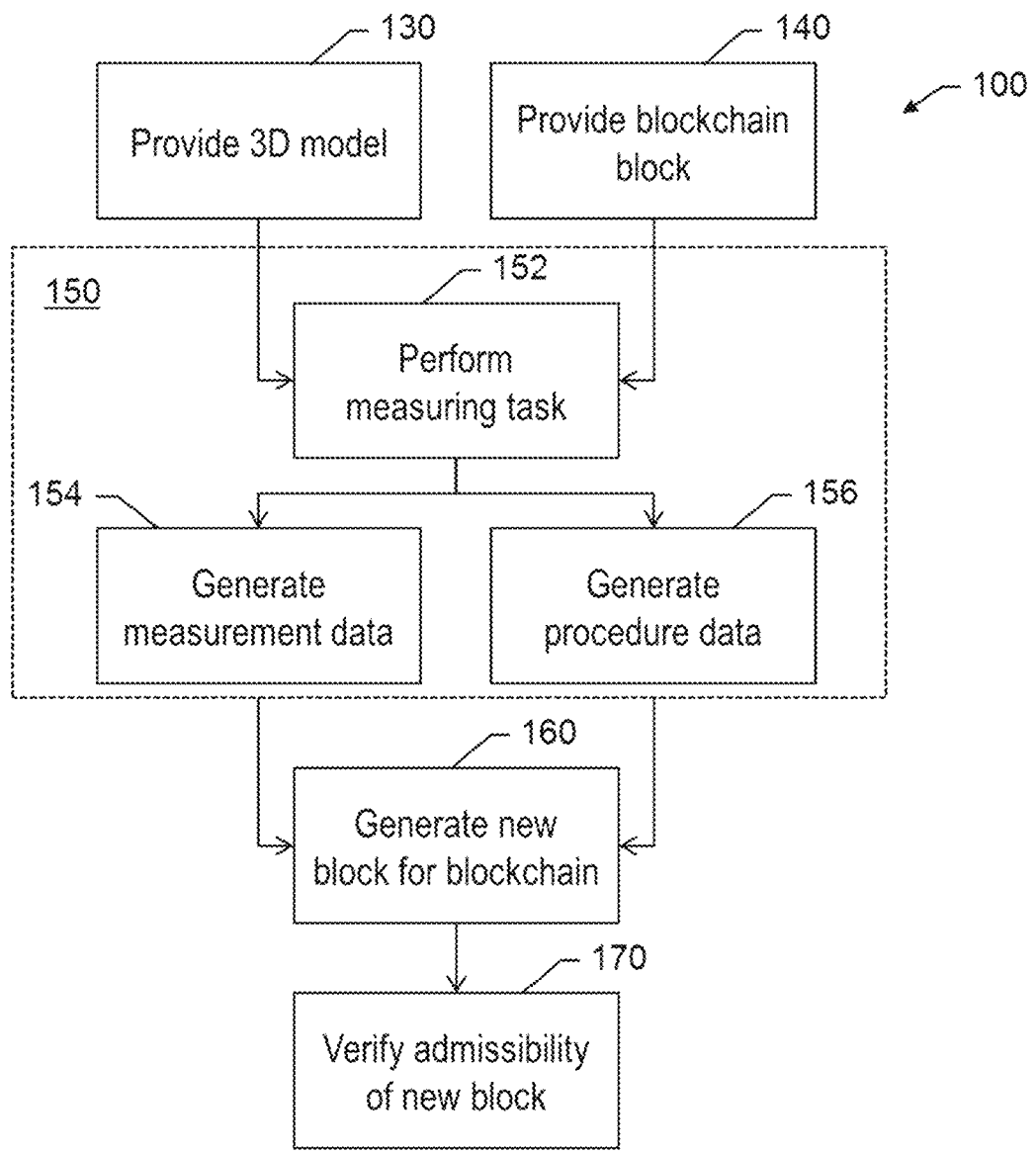
FIG. 6 illustrates another exemplary embodiment of a method according to the invention.

FIG. 6 shows a flowchart illustrating another exemplary embodiment of a method 100 according to the invention. With this embodiment, it is ensured that the measurement is performed according to defined conditions, so that the results of the measurements are reliable.

Optionally (not depicted here), the method 100 may begin with the same steps as the method of FIG. 5*a*, i.e. generating a 3D model of a construction and generating a blockchain. The step 150 of determining and reporting changes in this embodiment comprises the three substeps 152, 154 and 156.

The 3D model is provided 130 to the measuring system. Likewise, the current block of the blockchain is provided 140 to the measuring system. This current block comprises task data related to a measuring task (or a plurality of measuring tasks) to be performed in or at the building.

The measuring system interprets the task data and performs 152 the measuring tasks according to the task data of the current block of the blockchain. For instance, performing the measuring task comprises one or more measuring devices of the measuring system determining three-dimensional coordinates of the building or of certain parts of the building. The measuring devices may comprise laser scanners, laser trackers or geodetic apparatuses such as total stations. The measuring task may also comprise determining deviations of the actual data from the nominal data.

The task data also comprise information about predetermined conditions that have to be met when performing 152 the measuring task. The predetermined conditions may comprise conditions that the measuring system or its measuring devices must fulfil when performing the measuring task, e. g. the kinds of devices that are used can be specified, and also a measuring precision or a date of a latest calibration or inspection of the devices. The predetermined conditions may also comprise specifications for a setup of the measuring devices that must be fulfilled for performing the measuring task. For instance, the setup specifications may comprise position data defining a location at which certain devices need to be positioned during the measuring task.

The devices may comprise means for determining their position, e. g. a GNSS antenna. They may also be configured to determine their positions based on their measurement data. For instance, a laser scanner may recognize unique features of the building in a captured point cloud and determine its relative position to this feature. Also, certain reflective targets could be provided at known fixed points of the building, and the device measures a distance to one or more of the targets, recognizes the targets and thus determines its position in the building.

The predetermined conditions are provided to the measuring system. They may also be provided to a user of the system, so that suitable devices can be chosen for the measurement task and the devices can be set up correctly.

Having performed the measuring task, the measuring system generates 154 measurement data, comprising three-dimensional coordinates of the building obtained during performing 152 the measuring task. Moreover, the measuring system generates 156 procedure data comprising information related to circumstances of performing the measuring task, particularly those circumstances that are relevant in view of the predetermined conditions of the task data. In particular, the task data may comprise instructions for the measuring devices, what information the procedure data has to contain. For instance, the procedure data may comprise specification data related to actual device specifications of the measuring system or its measuring devices while performing the measuring task, such as the measuring precision or the date of the latest calibration or inspection. If the measuring devices are adapted to determine their positions while performing the measuring task, the setup data may comprise position data related to the position of the devices while performing the measuring task.

After in steps 152, 154 and 156 the measurement task or tasks have been performed and the measurement data and procedure data have been generated, a new block of the blockchain can be generated in step 160. The new block comprises hash data from the current block and a timestamp, and moreover the measurement data and the procedure data. Finally, the admissibility of the new block of the blockchain is verified 170. The verification comprises determining, based on the procedure data that has been generated for the measurement task and then stored in the new block, whether the measuring task has been performed according to the predetermined conditions or not. If the predetermined conditions have been met, the generated measurement data are considered reliable and the new block is accepted as admissible. If the predetermined conditions have not been met, the measurement data is considered not reliable and the new block is rejected.

In this embodiment, the first measuring system may be adapted to perform the measuring task autonomously, at least after a setup of the measuring devices, e. g. by a user of the measuring system. The predetermined conditions comprise setup specifications comprising conditions that the setup must fulfil when performing the measuring task. These setup specifications can be provided to the user—for instance on a mobile electronic device 45—to allow setting up the devices according to the predetermined conditions.

Figure 7:
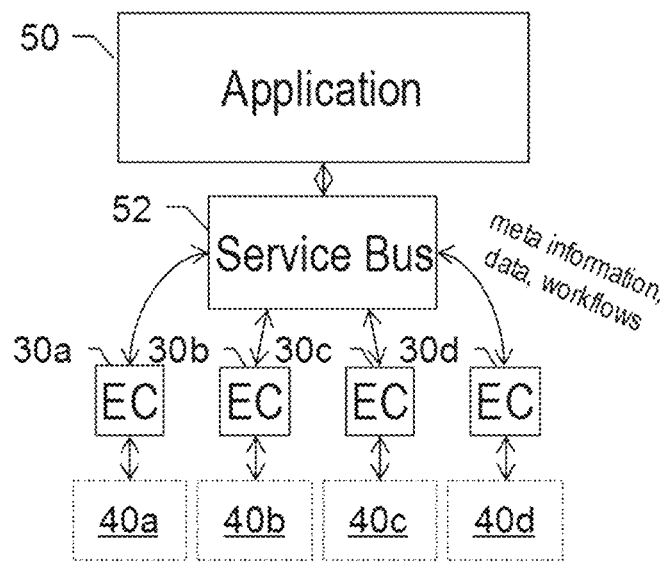
FIG. 7 shows an exemplary application to be used with the system according to the invention.

FIG. 7 shows an exemplary embodiment of an application 50 with several software agents provided in agent modules 30a-d connected to devices 40a-d and connected together using a service bus 52. A system according to the invention can comprise several agent modules 30a-d connected together using a service bus or a system and data integration software such as EdgeFrontier® (EF) of Intergraph Corporation. Applicable integration tools to be used with the application are generally known in the art and disclosed e. g. in the documents EP 3 156 898 A1, US 2008/0005287 A1, US 2008/0010631 A1 and U.S. Pat. No. 7,735,060 B2.

Although a server bus is shown in this Figure, in other embodiments, the software agents provided in agent modules 30a-d can also be connected directly to the application 50. Other embodiments comprise a combination of the two approaches, e. g. so that data can flow through the service bus 52 or directly via the agents to the application 50.

Figure 8:
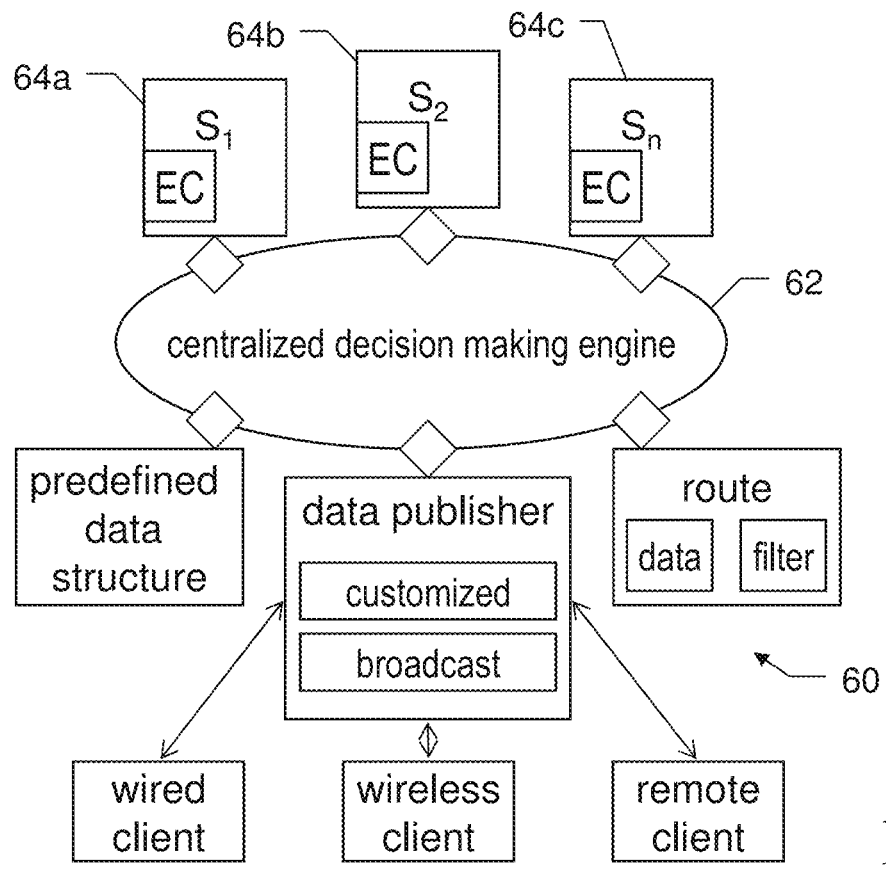
FIG. 8 illustrates an intelligent information platform used together with a system according to the invention.

FIG. 8 illustrates an intelligent information platform that can be used together with a system according to the invention and in some embodiments forms a part of the system according to the invention. In general, such a platform is described e. g. in the document EP 3 156 898 A1. The intelligent information platform provides a fully configurable distributed ERP-like (ERP=enterprise resource plan) information processing platform 60 that routes the information from systems 64a-c (e. g. measuring systems or devices as described above), based on certain rules and policies to a centralized decision-making engine 62.

Although the invention is illustrated above, partly with reference to some preferred embodiments, it must be understood that numerous modifications and combinations of different features of the embodiments can be made. All of these modifications lie within the scope of the appended claims.

What is claimed is:

1. A system for documenting a state of a building, the system comprising:
at least a first measuring system comprising at least one measuring device, wherein:
the at least one measuring device is a laser scanner, a laser tracker or a geodetic apparatus or a surveying device or a reality capture device, configured to perform measuring tasks for capturing actual data of the building and to determine three-dimensional coordinates of the building,
the at least one measuring device is adapted to determine its position while performing the measuring task and to generate position data related to the position of the measuring device while performing the measuring task, and setup data comprises the position data,
wherein the first measuring system comprises at least one software agent that is adapted to be used with the at least one measuring device, and each software agent is:
installable on one of the measuring devices, or
installed on a communication module that is adapted to be connected to a measuring device and to exchange data with the measuring device connected to,
wherein each software agent is adapted to exchange data with the measuring device it is installed on or connected to, and
at least one server having a processor, a communication unit allowing data interchange with the at least one software agent and a memory unit for storing a digital model of the building comprising nominal data related to a nominal condition of the building, the server being adapted to provide the digital model of the building to the first measuring system,
wherein the at least one server is adapted to provide a blockchain for tracking changes to the digital model of the building, the blockchain comprising a plurality of blocks, each block indicative of changes to the digital model of the building and comprising a timestamp, hash data of a previous block, and change data related to changes of the digital model of the building, such that each block represents one entry in a list of previous changes to the digital model, wherein a current block comprises current change data related to a latest change to the digital model of the building,
wherein the current block comprises task data related to one or more measuring tasks to be performed in or at the building, wherein the task data comprises predetermined conditions that have to be met when performing one of the measuring tasks, and wherein the first measuring system is adapted to
interpret the task data and perform at least one of the measuring tasks based on the task data,
generate measurement data obtained by performing the measuring task, the measurement data comprising three-dimensional coordinates of the building,
generate procedure data comprising information related to circumstances related to performing the measuring task, and
generate a new block of the blockchain indicative of changes to the digital model of the building and comprising hash data from the current block, a timestamp, the measurement data and the procedure data, wherein the at least one server is adapted to verify an admissibility of the new block, wherein the verification comprises determining, based on the procedure data, whether the measuring task has been performed according to the predetermined conditions, wherein the predetermined conditions comprise:
  set device specifications comprising conditions that the at least one measuring device must fulfil when performing the measuring task, and
  setup specifications comprising conditions that a setup of the at least one measuring device must fulfil when performing the measuring task;
the procedure data comprises:
  specification data related to actual device specifications of the at least one measuring device while performing the measuring task, wherein the specification data comprises a measuring precision of the at least one measuring device and/or comprises a date of the latest calibration or inspection of the at least one measuring device, and
  setup data related to the setup of the at least one measuring device while performing the measuring task; and
verifying the admissibility of the new block comprises determining whether the actual device specifications meet the conditions of the set device specifications and whether the setup meets the conditions of the setup specifications.

2. The system according to claim 1, wherein:
after a setup, by a user of the measuring system, of the at least one measuring device for a first measuring task of the measuring tasks, the first measuring system is adapted to perform the first measuring task autonomously, and
the system is configured to provide the setup specifications to the user on a mobile electronic device to allow setting up the devices according to the predetermined conditions.

3. The system according to claim 1, wherein the blockchain is stored distributed across a plurality of interconnected computing devices.

4. The system according to claim 1, wherein the first measuring system is adapted to:
use the digital model of the building and the current block to determine deviations of the actual data from the nominal data,
generate new change data comprising information about the deviations, and generate the new block of the blockchain comprising the new change data.

5. The system according to claim 1, wherein:
the actual data comprise three-dimensional coordinates of the building,
the at least one measuring device is configured to determine the three-dimensional coordinates, and
the first measuring system is adapted to use the three-dimensional coordinates to determine deviations of the actual data from the nominal data.

6. A method for documenting a state of a building, the method comprising:
providing a digital model of the building comprising nominal data related to a nominal condition of the building;
providing a blockchain for tracking changes to the digital model of the building, the blockchain comprising a plurality of blocks, each block indicative of changes to the digital model of the building and comprising a timestamp, hash data of a previous block, and change data related to changes of the digital model, such that each block represents one entry in a list of previous changes to the digital model of the building, wherein a current block comprises current change data related to a latest change to the digital model of the building, wherein the current block comprises task data related to one or more measuring tasks to be performed in or at the building for capturing actual data of the building and to determine three-dimensional coordinates of the building, wherein the task data comprises predetermined conditions that have to be met when performing one of the measuring tasks;
using at least one measuring device for performing at least one of the measuring tasks based on the task data;
wherein the at least one measuring device:
  is a laser scanner, a laser tracker or a geodetic apparatus or a surveying device or a reality capture device,
  is adapted to determine its position while performing at least one of the measuring tasks and to generate position data related to the position of the at least one measuring device while performing at least one of the measuring tasks, and
  is part of a measuring system comprising a plurality of devices, the method comprising providing a software agent to each one of the devices wherein each software agent is adapted to exchange data with the device and wherein providing the software agent comprises installing a software agent on the device or connecting a communication module to the apparatus, wherein a software agent is installed on the communication module;
generating measurement data obtained by performing the measuring task, the measurement data comprising three-dimensional coordinates of the building;
generating procedure data comprising information related to circumstances related to performing the measuring task;
generating a new block of the blockchain comprising hash data from the current block, a timestamp, the measurement data and the procedure data; and verifying an admissibility of the new block, wherein the verification comprises determining, based on the procedure data, whether the measuring task has been performed according to the predetermined conditions, wherein the predetermined conditions comprise:
  set device specifications comprising conditions that the at least one measuring device must fulfil when performing the measuring task, and
  setup specifications comprising conditions that a setup of the at least one measuring device must fulfil when performing the measuring task;
the procedure data comprises:
  specification data related to actual device specifications of the at least one measuring device while performing the measuring task, wherein the specification data comprises a measuring precision of the at least one measuring device and/or comprises a date of the latest calibration or inspection of the at least one measuring device, and
  setup data related to the setup of the at least one measuring device while performing the measuring task, wherein the setup data comprises the position data; and
verifying the admissibility of the new block comprises determining whether the actual device specifications meet the conditions of the set device specifications and whether the setup meets the conditions of the setup specifications.

7. The method according to claim 6, wherein performing a measuring task comprises determining actual data of the building, and the method further comprises:
   using the digital model of the building and the current block to determine deviations of the actual data from the nominal data, and
   generating new change data comprising information about the deviations,
   wherein the new block is generated comprising the new change data.

8. The method according to claim 6, wherein:
   the actual data comprise three-dimensional coordinates of the building,
   the at least one measuring device is used to determine the three-dimensional coordinates, and
   the three-dimensional coordinates are used to determine deviations of the actual data from the nominal data.

9. A computer program product comprising program code which is stored on a non-transitory machine-readable medium, and having computer-executable instructions for performing:
   controlling at least one measuring device for performing a method based on the task data, the method comprising:
      providing a digital model of the building comprising nominal data related to a nominal condition of the building;
      providing a blockchain for tracking changes to the digital model of the building, the blockchain comprising a plurality of blocks, each block indicative of changes to the digital model of the building and comprising a timestamp, hash data of a previous block, and change data related to changes of the digital model, such that each block represents one entry in a list of previous changes to the digital model of the building, wherein a current block comprises current change data related to a latest change to the digital model of the building, wherein the current block comprises task data related to one or more measuring tasks to be performed in or at the building for capturing actual data of the building and to determine three-dimensional coordinates of the building, wherein the task data comprises predetermined conditions that have to be met when performing one of the measuring tasks;
      using at least one measuring device for performing at least one of the measuring tasks based on the task data;
   wherein the at least one measuring device:
      is a laser scanner, a laser tracker or a geodetic apparatus or a surveying device or a reality capture device,
      is adapted to determine its position while performing at least one of the measuring tasks and to generate position data related to the position of the at least one measuring device while performing at least one of the measuring tasks, and
      is part of a measuring system comprising a plurality of devices, the method comprising providing a software agent to each one of the devices wherein each software agent is adapted to exchange data with the device and wherein providing the software agent comprises installing a software agent on the device or connecting a communication module to the apparatus, wherein a software agent is installed on the communication module;
   generating measurement data obtained by performing the measuring task, the measurement data comprising three-dimensional coordinates of the building;
   generating procedure data comprising information related to circumstances related to performing the measuring task;
   generating a new block of the blockchain comprising hash data from the current block, a timestamp, the measurement data and the procedure data; and verifying an admissibility of the new block, wherein the verification comprises determining, based on the procedure data, whether the measuring task has been performed according to the predetermined conditions, wherein the predetermined conditions comprise:
      set device specifications comprising conditions that the at least one measuring device must fulfil when performing the measuring task, and
      setup specifications comprising conditions that a setup of the at least one measuring device must fulfil when performing the measuring task;
   the procedure data comprises:
      specification data related to actual device specifications of the at least one measuring device while performing the measuring task, wherein the specification data comprises a measuring precision of the at least one measuring device and/or comprises a date of the latest calibration or inspection of the at least one measuring device, and
      setup data related to the setup of the at least one measuring device while performing the measuring task, wherein the setup data comprises the position data; and
   verifying the admissibility of the new block comprises determining whether the actual device specifications meet the conditions of the set device specifications and whether the setup meets the conditions of the setup specifications.

* * * * *